March 15, 1966      G. E. PRICE      3,240,917

OVEN HEATER ASSEMBLY

Filed May 6, 1963      2 Sheets-Sheet 1

March 15, 1966  G. E. PRICE  3,240,917
OVEN HEATER ASSEMBLY
Filed May 6, 1963  2 Sheets-Sheet 2
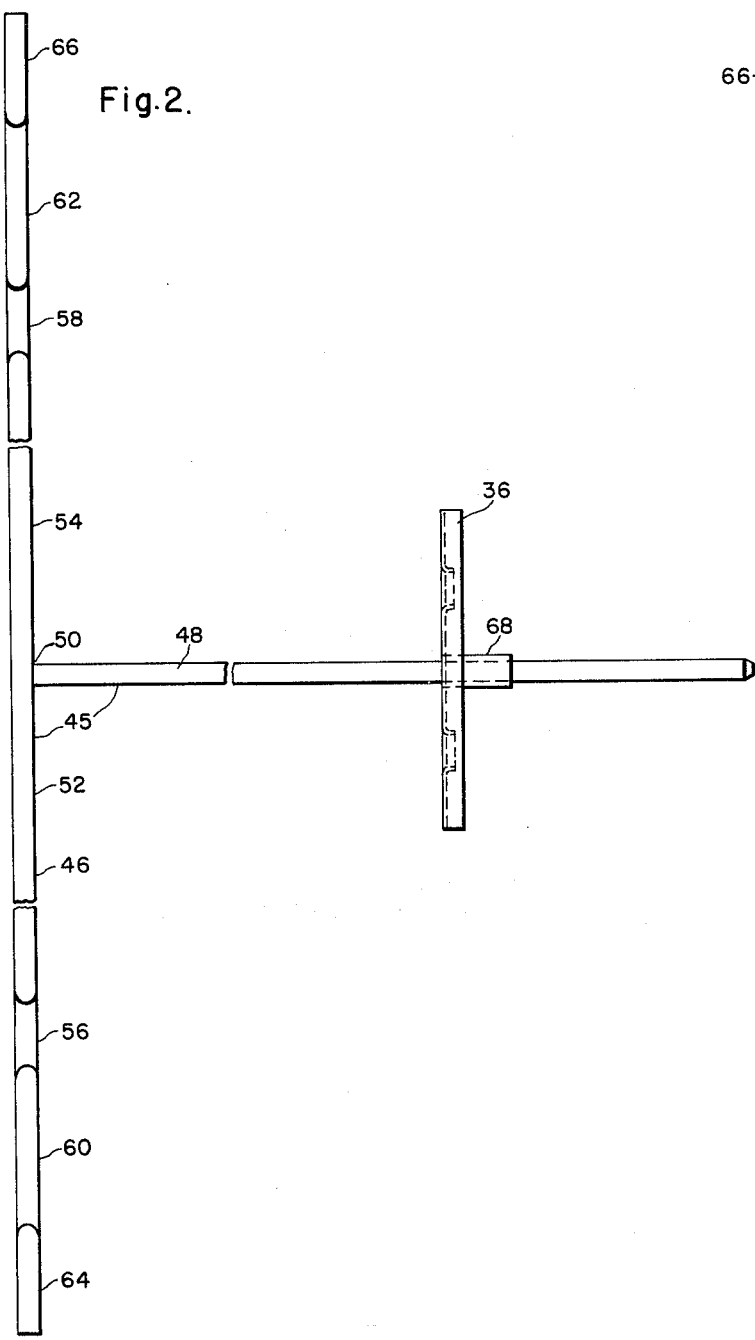
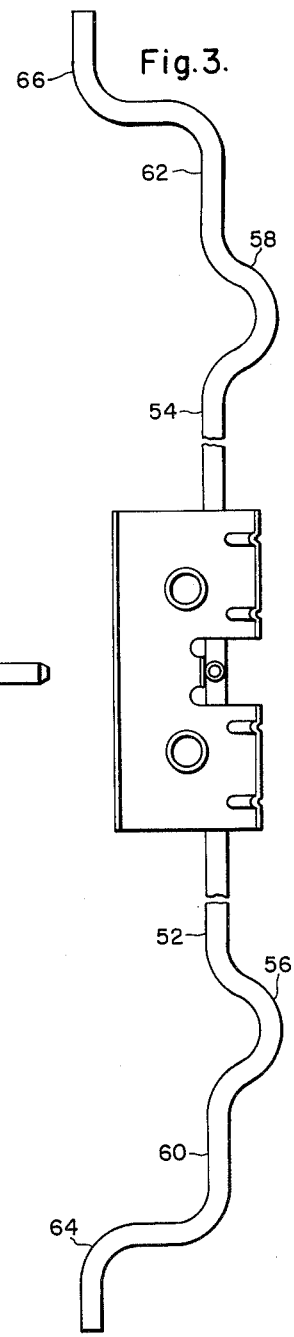
WITNESSES
Theodore F. Wrobel
James F. Young
INVENTOR
George E. Price
BY
Robert T. French
ATTORNEY

United States Patent Office 3,240,917
Patented Mar. 15, 1966

3,240,917
OVEN HEATER ASSEMBLY
George E. Price, Mansfield, Ohio, assignor to Westinghouse Electric Corporation, Pittsburgh, Pa., a corporation of Pennsylvania
Filed May 6, 1963, Ser. No. 278,002
4 Claims. (Cl. 219—532)

The present invention relates to oven heater assemblies, and more particularly to removable oven heater assemblies having supporting structures incorporated therein.

A desirable feature in electrical ovens is that of having a removable oven heater element, which may be detached from the oven for cleaning, for example. To provide such a detachable heating element, the heater element itself must be supported away from the oven floor and also must be of such a design to permit ready withdrawal of the heating element, without damage, from the oven. Some presently used heater assemblies require a separate wire rack to support the heater element. This necessitate two separate parts thus increasing the cost of the assembly. Moreover, because of the separability of the parts it may be necessary to remove the heating element by applying force or pulling on the heating element itself. Also in replacing the heater element the user must again apply force or push the heating element into engagement with the electrical connector in the oven. Because of its irregular loop shape the tubular heating element is comparatively weak and may readily be deformed from its desired shape. Such deformation will affect the baking characteristics of the oven, and, furthermore, may be destructive to the heater element necessitating its eventual replacement. Other types of heater elements have eliminated the wire rack structure by either welding or crimping two "foot" members to the heater element itself at the front portion of the heater tube. This permits the heater element to be self-supporting from the oven floor. However, in order to remove and replace the heater element, the user must pull or push upon the relatively weak heater element to accomplish the detachable function. The reduced cost of the self-supporting structure is offset by the attendant disadvantages of the deformation and possible destruction of the heater element. Larger diameter tubular heating elements may be utilized to reduce the amount of deformation, however, this brings about a substantially higher priced assembly.

It is therefore an object of the present invention to provide a new and improved oven heater assembly which provides adequate support for the heating element, while being readily attachable.

It is a further object of the present invention to provide a new and improved oven heater assembly in which the heater element is adequately supported, readily detachable without deformation or damage to the heating element and relatively low in cost.

Broadly, the above cited objects are accomplished in an oven heater assembly in which a support member is integrally connected to the heater element to support the heater element, while providing structural strength to the loop of the heating element and also providing means of applying force to the asesmbly through the support structure rather than through the heating element itself.

These and other objects will become more apparent when considered iin view of the following specification and drawings, in which:

FIG. 2 is a plan view of the support member for the heater assembly of FIG. 1; and, FIG. 3 is a side view of FIG. 2.

Figure 1:
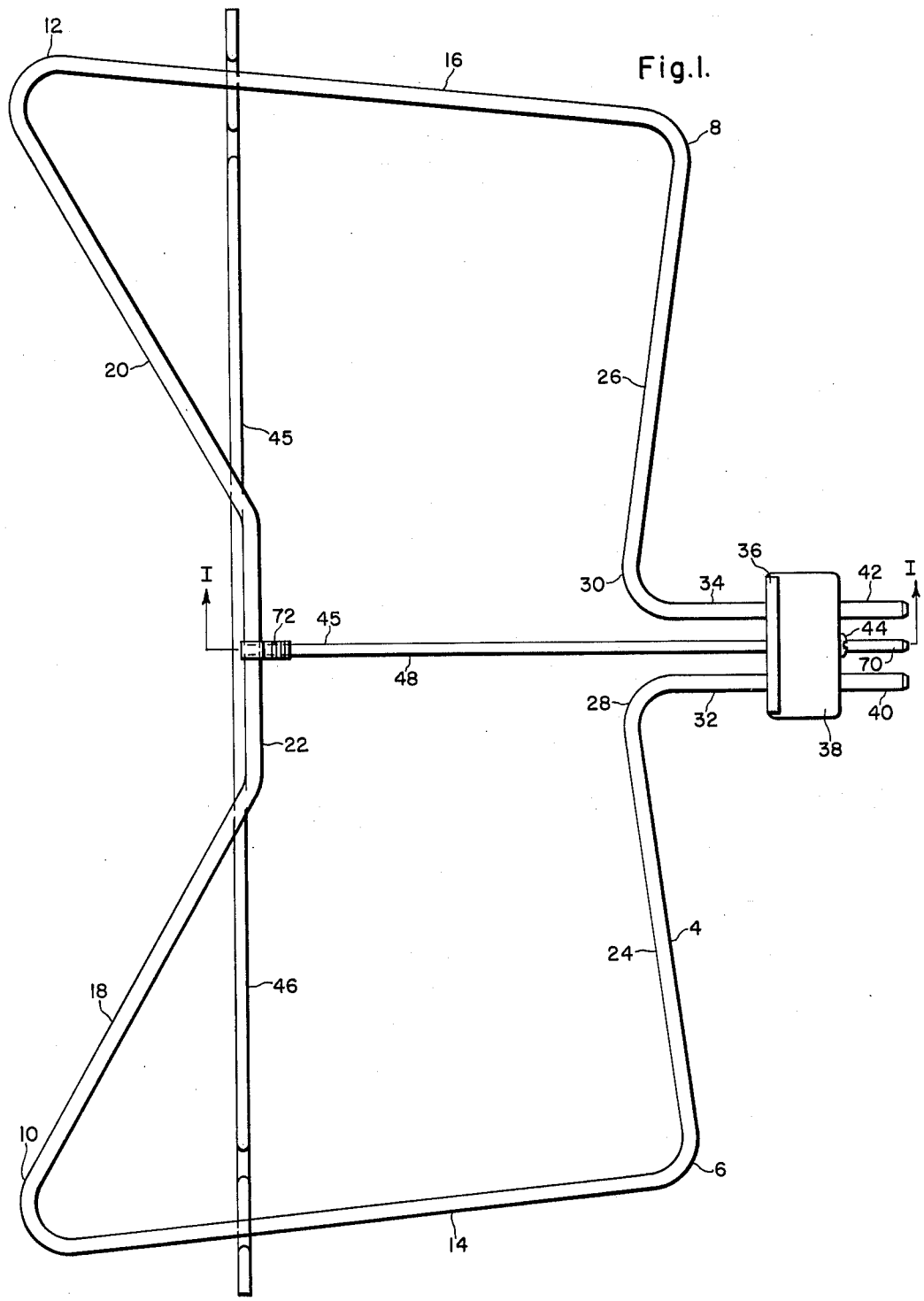
FIGURE 1 is a plan view of the heater assembly of the present invention.

Referring to FIG. 1, the heater element 4 is bent in the shape of an irregular flat loop which is symmetrical about its front to rear axes I—I. The heating element comprises a long helically coiled electrical resistance element, not shown, which is enclosed in a tubular metal sheath. The helical resistance coil and the metal sheath are suitably insulated from each other by, for example, compacted granulated magnesium oxide. The heater loop is formed to have the rear corners 6 an 8 and the front corners 10 and 12. Substantially straight side portions 14 and 16 are formed between the corners 6 and 10 and 8 and 12, respectively. The portion of the heater loop between the front corners 10 and 12 is bent inwardly toward the center of the loop in a V-shape. The inwardly bent V-portion has the substantially straight sections 18 and 20 and a bottom section 22, which is also substantially straight to complete the V. At the rear portion of the loop extending from the rear corners 6 and 8, respectively, are the straight portions 24 and 26, which extend toward the front to rear center-line I—I of the loop. At the inner rear corners 28 and 30 the heater element is bent to form the substantially parallel sections 32 and 34. The heater element then extends through the terminal shield 36 into the insulating connector block 38. Within the connector block 38 the resistive heating coil is connected electrically to the male contacts 40 and 42 of the parallel sections 32 and 34, respectively. The male contacts 40 and 42 are designed for engagement to female contacts disposed in the rear of an electric oven. A push-on fastener 44 is provided to secure the insulating block to the terminal shield 36.

Turning now also to FIGS. 2 and 3, a support member 45 is shown having a substantially T-shape. The support member 45 consists of the cross member 46 and a rod member 48, which is fixed to the cross member, for example, by welding at the joint 50. The cross member 46 extends laterally across the oven and heater element, and the rod member 48, substantially normal to the cross member 46, extends from front to rear of the oven.

The cross member 46 has the substantially straight handle portions 52 and 54 extending from the joint 50. Next to the handle portions 52 and 54 are the foot portions 56 and 58, respectively. The foot portions 56 and 58 are bent into the cross member 46 so that they extend downwardly from the cross member, hence supporting the cross member and heater element from the bottom wall of the oven. The substantially straight portions 60 and 62 then extend laterally from the foot portions 56 and 58, respectively. The portions 60 and 62 support the side portions 14 and 16 of the heater loop. The cross member then extends upwardly from the portions 60 and 62 to the outside of the loop at the portions 64 and 66. The upwardly and outwardly extending portions 64 and 66 limit lateral movement of the heater element within the oven. Moreover, the outwardly extending sections of the portions 64 and 66 may be utilized to engage side flanges of the oven to maintain the entire structure within the oven.

The rod member 48 provides front to rear support for the loop by being fixed to the terminal shield 36 and to the heater element 4. The rod 48 is fixed to the terminal shield through the use of the sleeve 68 which is spot welded to the rod 48 and the terminal shield 68. Alternatively, the rod 48 may be directly spot welded to the terminal shield 68. The rod 48 then extends through the terminal shield and the insulating block 38 to form the terminal 70 serving as the ground electrical connector utilized in conjunction with the male connectors 40 and 42.

The heating element 4 is rigidly secured to the T-shaped support member 45 through the tie bracket 72.

The tie bracket 72 is looped over the heater element 4 at the portion 22, which is the inwardly extending portion of the V-shaped front portion of the heater loop. The looper portion of the tie bracket 72 securely grips the heater element for permanent integral connection thereto. The tie bracket 72 is welded to the rod member 48 thus securing the ground rod 48 to the heater element 4 in a secure manner to prevent front to rear movement or deformation of the heater loop.

The looped heater element 4 and the T-shaped support bracket integrally connected together provide a heater assembly which may readily be attached and detached from the oven. The user may readily remove or replace the entire heater assembly by grasping the handle portions 52 and 54 of the cross member 46. This eliminates the need for grasping the heater element itself in order to remove or replace the assembly and prevents possible damage or deformation of the heater loop. The support member 45 being rigidly secured to the heater element through the tie rod 72 and at the terminal shield 36 provides front to back support to the assembly as well as preventing deformation when it is desired to remove or replace the heating assembly. The cross member 46 of the support member 45 provides lateral support for the heating element 4 as well as supporting the heating element through the foot portions 56 and 58 from the bottom wall of the oven. Moreover, the upwardly and outwardly directed portions 64 and 66 of the cross member 46 limit lateral movement of the entire heater assembly within the oven. Hence, a relatively simple, low cost, structurally sound heater assembly is provided which is self-supporting and provides front to back support so that the assembly may be removed and replaced from the oven without deforming or damaging the heater element itself.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. An oven heater assembly comprising, a heater element formed in the shape of a flat irregular loop, said loop having a pair of front corners and a pair of rear corners, with side portions extending between said front and rear corners, with the portion of said heater element between the front corners extending inwardly toward the center of said loop, an electrical connector for making electrical connections to said heater element, and a T-shaped member having a cross member and a rod member extending substantially normal to and being fixed to said cross member, said cross member extending laterally of said heater element beneath the inwardly extending front portion of said heater element, and beneath said side portions at locations spaced rearwardly of said front corners, to support said heater element and to prevent lateral movement of said heater element, said rod member of said T-shaped member being rigidly fixed to said heater element at the inwardly extending front portion, said rod member extending rearwardly of said heater element and being fixed to said electrical connector.

2. A removable oven heater assembly comprising, an electrical resistance heater element formed in the shape of a flat irregular loop, said loop having a pair of front corners and a pair of rear corners, with side portions extending between said front and rear corners, with the portion of said heater element between the front corners extending inwardly toward the center of said loop, an electrical connector for making electrical connections to said heater element, and a T-shaped member having a cross member and a rod member extending substantially normal to and being fixed to said cross member, said cross member extending laterally of said heater element beneath the inwardly extending front portion of said heater element, and beneath said side portions at locations spaced rearwardly of said front corners, said cross member having downwardly extending spaced foot portions formed therein to engage the bottom wall of an oven and support said heater element, said rod member being rigidly fixed to said heater element at the inwardly extending front portion, said rod member extending rearwardly of said heater element and being fixed to said electrical connector.

3. In a removable oven heater assembly the combination of: a tubular sheathed electrical resistance heater element formed in the shape of a flat irregular loop, said loop having a pair of front corners and a pair of rear corners with the portion of said heater element between the front corners extending inwardly toward the center of said loop, an electrical connector for making electrical connections to said heater element, and a T-shaped member having a cross member and a rod member extending substantially normal to and being fixed to said cross member, said cross member extending laterally of said heater element beneath the inwardly extending front portion of said heater element, said cross member extending substantially upwardly of the said heater element and extending laterally above the heater element to the outside of said loop to prevent lateral movement of said heater element, said rod member extending beneath said heater element and being fixed to said heater element at the inwardly extending front portion, said rod member extending rearwardly of said heater element and being fixed to said electrical connector.

4. In a removable oven heater assembly the combination of: a tubular sheathed electrical resistance heater element formed in the shape of a flat irregular loop, said loop having a pair of front corners and a pair of rear corners with the portion of said heater element between the front corners extending inwardly toward the center of said loop, an electrical connector for making electrical connections to said heater element, and a T-shaped member having a cross member and a rod member extending substantially normal to and being fixed to said cross member, said cross member extending laterally of said heater element beneath the inwardly extending front portion of said heater element, said cross member having a pair of downwardly extending spaced foot portions formed therein to engage the bottom wall of an oven, said cross member extending substantially upwardly and extending laterally above the heater element to the outside of said loop to prevent lateral movement of said heater element, said rod member extending beneath said heater element and being fixed to said heater element at the inwardly extending front portion, said rod member extending rearwardly of said heater element and being fixed to said electrical connector.

References Cited by the Examiner

UNITED STATES PATENTS

| | | | |
|---|---|---|---|
| 2,844,700 | 7/1958 | Kraus | 219—409 |
| 2,844,701 | 7/1958 | Barnett | 219—552 |
| 2,872,558 | 2/1959 | Price | 219—532 |
| 3,005,082 | 10/1961 | Ammerman | 219—537 |

RICHARD M. WOOD, *Primary Examiner.*